United States Patent
McQueen et al.

(10) Patent No.: US 10,688,581 B2
(45) Date of Patent: Jun. 23, 2020

(54) 3D METAL PRINTING DEVICE AND PROCESS

(71) Applicant: The Board of Trustees of Western Michigan University, Kalamazoo, MI (US)

(72) Inventors: James McQueen, Harrison, MI (US); Daniel T. Ziemer, Eaton Rapids, MI (US); Matthew W. Ziemer, Eaton Rapids, MI (US); Jacob Thomas Ives, Kalamazoo, MI (US); Pavel Ikonomov, Portage, MI (US)

(73) Assignee: The Board of Trustees of Western Michigan University, Kalamazoo, MI (US)

( * ) Notice: Subject to any disclaimer, the term of this patent is extended or adjusted under 35 U.S.C. 154(b) by 632 days.

(21) Appl. No.: 15/359,906

(22) Filed: Nov. 23, 2016

(65) Prior Publication Data
US 2017/0144242 A1    May 25, 2017

Related U.S. Application Data (60) Provisional application No. 62/259,228, filed on Nov. 24, 2015.

(51) Int. Cl.
*B23K 9/04* (2006.01)
*B23K 9/173* (2006.01)
(Continued)

(52) U.S. Cl.
CPC ............ *B23K 9/044* (2013.01); *B23K 9/0953* (2013.01); *B23K 9/125* (2013.01); *B23K 9/173* (2013.01);
(Continued)

(58) Field of Classification Search
CPC .. B23K 90/0216; B23K 90/04; B23K 90/044; B23K 90/0953; B23K 90/125;
(Continued)

(56) References Cited

U.S. PATENT DOCUMENTS

| | | | |
|---|---|---|---|
| 5,207,371 A | 5/1993 | Prinz et al. | |
| 6,274,839 B1 * | 8/2001 | Stone | B23K 9/04 219/125.1 |

(Continued)

FOREIGN PATENT DOCUMENTS

| | | |
|---|---|---|
| WO | 9710067 | 3/1997 |

OTHER PUBLICATIONS

Beth Mckenna, 3-D Printing in the Aerospace Industry: How General Electric and United Technologies Are Using This Technology, retrieved on Apr. 28, 2014, http://www.fool.com/investing/general/2014/02/28/3-d-printing-in-the-aerospace-industry-how-general.aspx.

(Continued)

*Primary Examiner* — Hung D Nguyen
(74) *Attorney, Agent, or Firm* — Price Heneveld LLP (57) ABSTRACT

A 3D metal printing machine or apparatus includes a welder that deposits one or more layers of metal, and a powered cutting tool that may be utilized to remove a portion of the metal deposited by the welder after the metal has solidified. Numerous layers of metal can be deposited and machined to form complex 3D metal parts. During fabrication, a part may be formed on a support whereby the part can be fabricated by welding and machining operations without removing the part from the support. A 3D CAD model of a part may be utilized to generate code that controls the 3D metal printing apparatus. A measuring device such as a probe or laser scanner may be utilized to measure the shape/size of parts in the 3D metal printing machine.

20 Claims, 11 Drawing Sheets

(51) Int. Cl.
| | |
|---|---|
| B23K 9/095 | (2006.01) |
| B23K 9/32 | (2006.01) |
| B33Y 10/00 | (2015.01) |
| B33Y 30/00 | (2015.01) |
| B33Y 40/00 | (2020.01) |
| B33Y 50/02 | (2015.01) |
| B23K 9/12 | (2006.01) |

(52) U.S. Cl.
 CPC .............. *B23K 9/32* (2013.01); *B33Y 10/00* (2014.12); *B33Y 30/00* (2014.12); *B33Y 40/00* (2014.12); *B33Y 50/02* (2014.12)

(58) Field of Classification Search
 CPC .... B23K 90/127; B23K 90/173; B23K 90/32; B33Y 10/00; B33Y 30/00; B33Y 40/00; B33Y 50/02
 USPC ........... 219/73.21, 74, 76.1; 29/527.1, 527.2, 29/527.5, 527.6, 56.5; 164/46, 47; 228/119, 125, 159
 See application file for complete search history.

(56) References Cited

U.S. PATENT DOCUMENTS

| | | | | |
|---|---|---|---|---|
| 2002/0111707 | A1* | 8/2002 | Li | B29C 64/112 700/118 |
| 2015/0000108 | A1 | 1/2015 | Hascoet et al. | |

OTHER PUBLICATIONS

Kyle Maxey, Mitsubishi to Introduce Metal 3D Printer in North America, retrieved Apr. 20, 2014, http://www.engineering.com/3DPrinting/3DPrintingArticles/ArticleID/6903/Mitsubishi-to-Introduce-Metal-3D-Printer-in-North-America.aspx.
Anzalone et al., "A Low-Cost Open-Source Metal 3-D Printer," IEEE Access, vol. 1, Dec. 9, 2013, 8 pages.
Thomas Campbell et al., "Could 3D Printing Change the World?," retrieved on Apr. 28, 2014, http://www.atlanticcouncil.org/publications/reports/could-3d-printing-change-the-world, 16 PAGES.
Bohra et al., "Evaluation of a 3D Light Cured Sand for Rapid Casting Technology," 118th Metalcasting Congress, American Foundry Society, Apr. 8-11, 2014—Schaumburg, IL USA, 10 pages.
Grieve et al., "Dual Purpose Desktop Machine—3D Printer and CNC Milling," Proceedings of the 2014 ASEE North Central Section Conference, Rochester, MI, Apr. 2014. 8 pages.
Goodrich, M. "Scientists Build a Low-Cost, Open-Source 3D Metal Printer." Michigan Tech News, http://www.mtu.edu/news/stories/2013/november/story99506.html, Nov. 19, 2013, 4 pages.
Physics.Org/Discover, "How does 3D printing work?" Explore physics.org., N.p., Web. Mar. 18, 2014. <http://www.physics.org/article-questions.asp?id=120>. 1 page.
RepRapWiki, "Metal deposition print head" N.p., n.d. Web. Mar. 18, 2014. <http://reprap.org/wiki/Metal_deposition_print_head>. 11 pages.
Kasten, M. (n.d.), "Strength of Aluminum vs Strength of Steel. Aluminum Strength vs Steel Strength." Retrieved Mar. 25, 2014, from: http://www.kastenmarine.com/alumVSsteel.html. 9 pages.
Stu Robarts, "3D-printing robot creates freestanding metal structures," (n.d.). 3D-printing. Retrieved Mar. 25, 2014, from: http://www.gizmag.com/3d-metal-printing-robot/30938/, 5 pages.
Michael Molitch-Hou, 3D Printin Industry, "Free Form Metal 3D Printer is a 3Doodler on Steroids." (n.d.). Retrieved Mar. 25, 2014, from: http://3dprintingindustry.com/2014/02/21/free-form-metal-3d-printer-3doodler-steroids/, 4 pages.
Joris Laarman, "Introducing large scale multi axis 3D printing in Metal," MX3D, Feb. 19, 2014. Retrieved Mar. 25, 2014, from: http://www.jorislaarman.com/mx3d-metal.html#description, 1 page.
McQueen et al., https://www.youtube.com/watch?v=8Gib1J8U1aQ, You Tube Video, Nov. 25, 2015, 1 page.
Jones, R. (Jun. 24, 2011). "A new approach to printing metals." RepRap: Blog. Retrieved Mar. 25, 2014, from: http://blog.reprap.org/2011/06/new-approach-to-printing-metals.html, 8 pages.
Rotometals, "Low Melt/Fusibe Alloys." Retrieved Mar. 25, 2014, from: http://www.rotometals.com/Low-Melting-Fusible-Alloys-s/21.htm, 6 pages.
Canada Intellectual Property Office, International Application No. 2,913,288, Aug. 17, 2018 (3 pages).

* cited by examiner

3D METAL PRINTING DEVICE AND PROCESS

CROSS REFERENCE TO RELATED APPLICATION

This application claims the benefit of U.S. Provisional Application No. 62/259,228 filed on Nov. 24, 2015, entitled, "3D METAL PRINTING DEVICE AND PROCESS," the entire contents of which are incorporated herein by reference.

BACKGROUND OF THE INVENTION

Various systems that utilize three dimensional (3D) plastics printing have been developed. However, the plastics parts produced utilizing known 3D printers may have limited use.

BRIEF SUMMARY OF THE INVENTION

One aspect of the present invention is a three dimensional (3D) printing device/machine/apparatus that deposits successive layers of molten metal utilizing a welding system to fabricate a metal part corresponding to a 3D model that may be generated using computer aided design Computer Aided Design (CAD) software. The machine also includes a powered cutting tool that may be utilized to remove a portion of the metal deposited by the welder after the molten metal has solidified. Numerous layers of metal can be deposited and machined to form complex 3D metal parts that have exact tolerances as a result of the machining steps. Parts fabricated using the 3D apparatus/process of the present invention do not suffer from imperfections between the layers of metal found in parts made from other 3D metal printing processes (e.g. laser sintered metal particles) because the molten metal layer melts and fuses completely with the metal layer below it. The machine may include a head assembly having a welding head and a machine tool. During fabrication of a metal part, the part may be positioned on a metal plate or other suitable support whereby the part can be fabricated (3D printed) by welding and machining operations without removing the part from the support.

Parts may be designed utilizing CAD software, and the CAD model/data may be converted to a Stereolithographic (STL) model/data or Computer Aided Manufacturing (CAM) software. The STL model data may be imported to three dimensional "slicing" software to create individual slices based on desired parameters such as layer height, solid layer, in fill, fill pattern, pattern spacing, diameter of the wire size, size of the objects, starting point, etc. The slicing software or CAM software can be utilized to produce Computer Numerical Control (CNC) G-code.

The welding head may comprise a gas metal arc welding (GMAW) device (also known as MIG welding). Steel, aluminum, or other metals may be utilized in the process. The machining head may comprise a rotary milling unit having a rotary cutter. Alternatively, the machining head may comprise a grinder or other suitable device as required for a particular application.

These and other features, advantages, and objects of the present invention will be further understood and appreciated by those skilled in the art by reference to the following specification, claims, and appended drawings.

DETAILED DESCRIPTION

Figure 1:
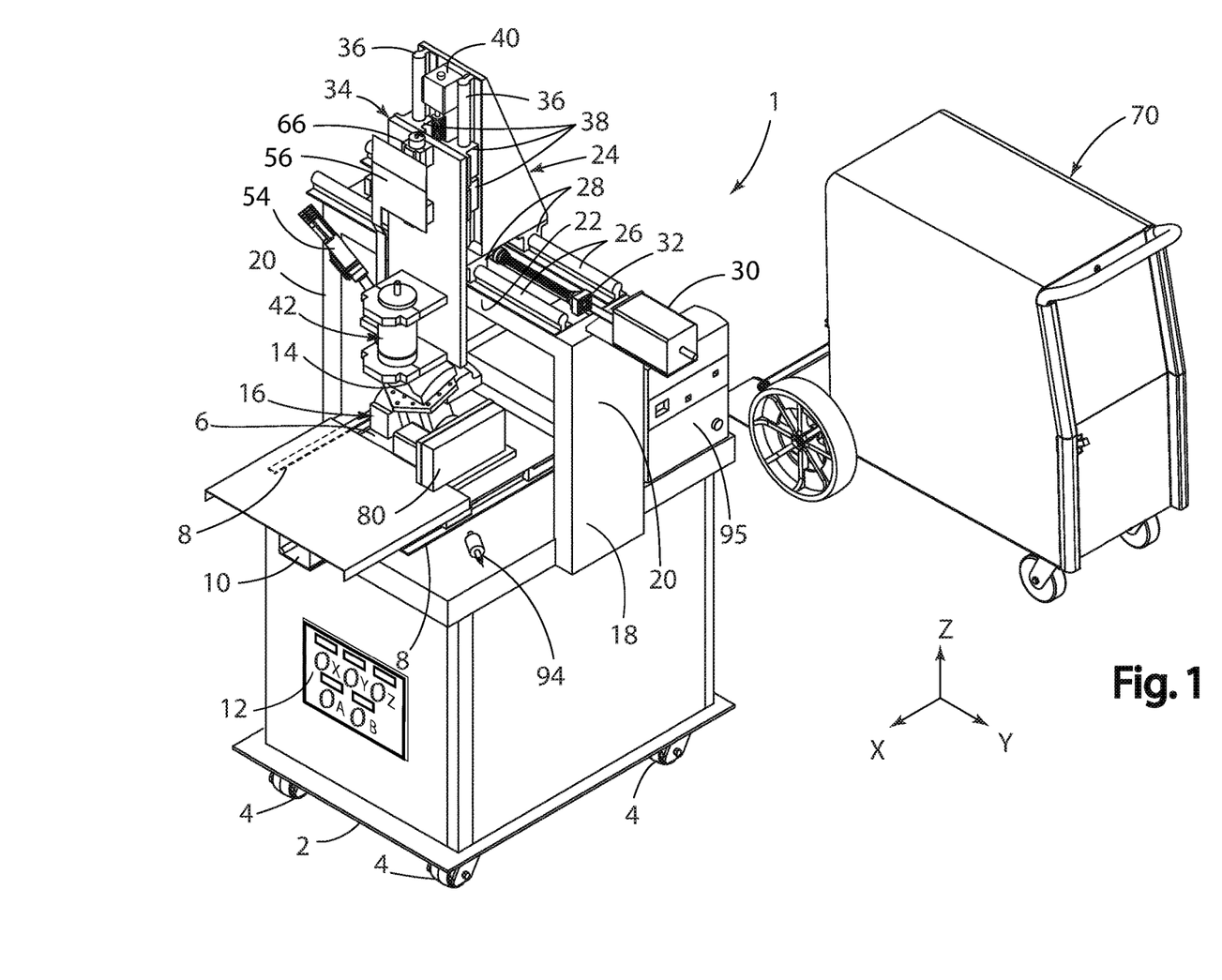
FIG. 1 is an isometric view of a machine/apparatus according to one aspect of the present invention.
Figure 1A:
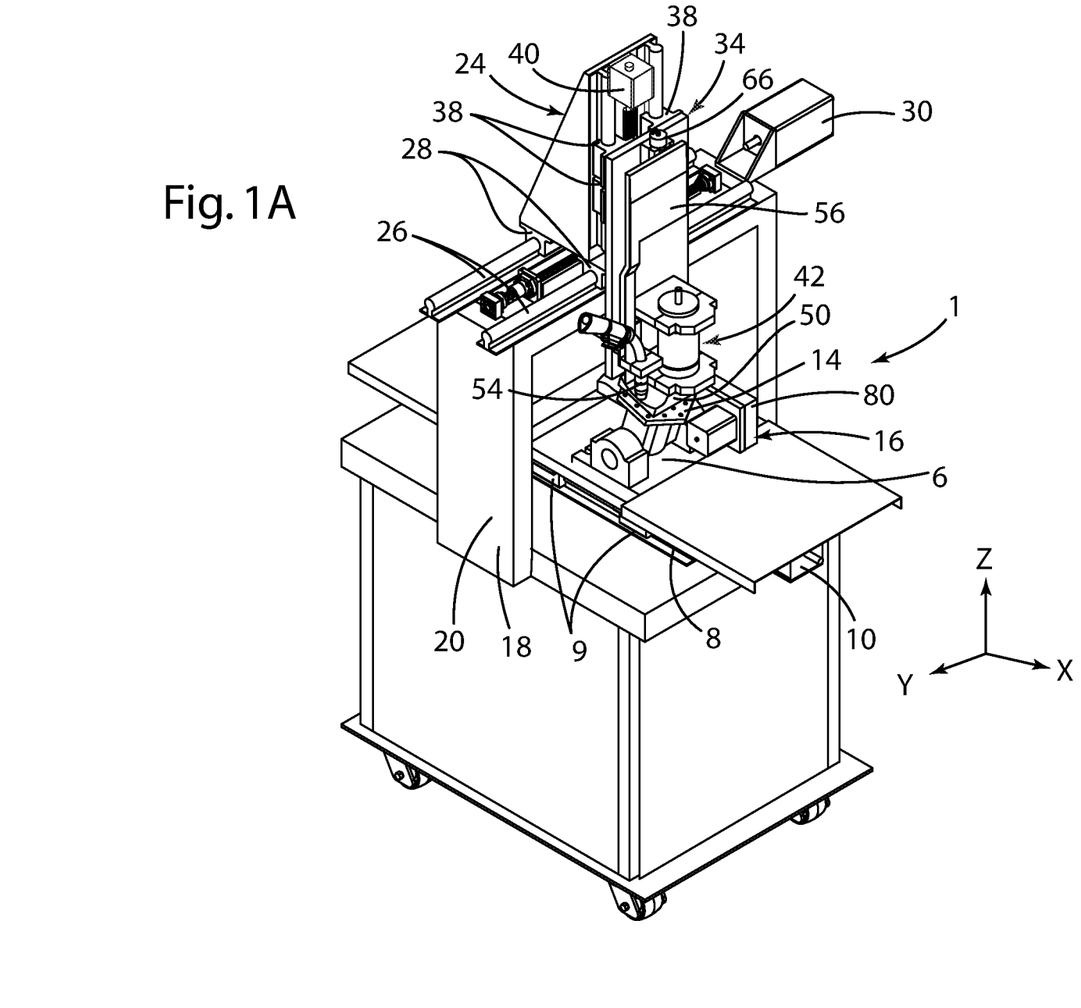
FIG. 1A is an isometric view of the machine/apparatus of FIG. 1.

For purposes of description herein, the terms "upper," "lower," "right," "left," "rear," "front," "vertical," "horizontal," and derivatives thereof shall relate to the invention as oriented in FIGS. 1 and 1A. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1 and 1A, a 3D metal printing apparatus or machine 1 according to one aspect of the present invention includes a welding gun or tip 54 and a machining head 42 that are operably mounted to a base 2 for powered 2 axis movement relative to base 2 in the Y and Z directions. Base 2 may be mounted on rollers 4. A support table 6 is movably mounted to the base 2 for linear reciprocating movement along the X axis. The support table 6 may be movably mounted to base 2 by linear guides comprising elongated rods 8 and pillow blocks 9. Other suitable linear guides may also be utilized. A powered actuator such as a first electric motor 10 having a ball screw drive may be selectively actuated by a control system such as controller 12 to shift the support 6 along the X axis. It will be understood that controller 12 comprises a control system that may include numerous components. Thus, the terms "controller" and "control system" as used herein are not limited to a specific controller, but rather broadly refer to a control system/device that provides for control of 3D metal printing machine 1 and/or related components utilized therewith. As discussed in more detail below, a work plate assembly 14 may be mounted to a two-axis mechanism 16 that is mounted to the support table 6. In use, parts are fabricated on the work plate assembly 14, and the two-axis mechanism 16 provides for powered rotation of the work plate assembly 14 about two additional axes A and B (FIG. 3) to provide 5 axis capability.

Base 2 includes an upper mounting structure 18. Including a pair of upwardly extending side portions 20 and a horizontal upper portion 22 that extends between the upright side portions 20. A bracket structure 24 is movably mounted to the upper mounting structure 18 for powered back and forth movement along the Y-axis. The bracket structure 24 may be movably mounted to horizontal upper portion 22 of upper mounting structure 18 by a linear guide including elongated rods 26 and pillow blocks 28. A second electric motor 30 and ball screw 32 provide for powered horizontal (Y direction) movement of bracket structure 24 relative to base 2. The second electric motor 30 is also operably connected to the controller 12.

An upright plate 34 is movably mounted to the bracket structure 24 for reciprocating vertical (Z direction) movement by a linear guide including rods 36 and pillow blocks 38. A third electric motor and ball screw 40 provide for powered vertical (Z direction) movement of plate 34 relative to bracket structure 24. The third electric motor 40 is also operably connected to the controller 12.

A machining head 42 (see also FIG. 2) is mounted to the plate 34 by brackets 44 or other suitable means. The machining head 42 includes an electric spindle motor 46 and a spindle/collet 48 that rotates upon actuation of the electric motor 46. The electrical motor 46 is also operably connected to controller 12. A cutting tool 50 may be mounted to the spindle 48 utilizing a suitable collet or other such arrangement. In the illustrated example, cutting tool 50 comprises a mill having cutting edges 52 that are configured to cut/remove metal from a part during fabrication thereof. It will be understood that the machining head 42 may comprise a drill, milling cutter, grinder, laser, or other suitable machine tool configured to remove metal.

Referring again to FIG. 2, a welding gun/tip 54 is mounted to a bracket 56. Bracket 56 includes a vertically extending portion 58 and an upper horizontal portion 60. Thus, in the illustrated example, the bracket 56 has a shape that is somewhat similar to an upside down L. The bracket 56 is movably mounted to the plate 34 for vertical (Z direction) movement relative to plate 34 by linear guides such as rods 62 and pillow blocks 64. A fifth electric motor 66 and ball screw 68 operably interconnect the bracket 56 and plate 34 to provide powered vertical (Z direction) movement of bracket 56 relative to plate 34. The fifth electric motor 66 is also operably connected to the controller 12. The welding tip 54 is connected to a welding unit 70 (FIG. 1) by one or more lines 72. The welding tip and welding unit 70 preferably comprise a metal inert gas (MIG) welding unit, and inert gas and wire are fed to the weld tip 54 through the lines 72 in a known manner. As discussed in more detail below, the welding tip 54 can be vertically shifted upon actuation of electric motor 66 from a retracted position shown in solid lines in FIG. 2 to an extended position shown in dashed lines in FIG. 2. This causes welding tip 54 to extend and retract relative to the machining head 42. When welding tip 54 is extended, it deposits molten metal onto metal plate 84 (FIG. 3). Extensions of weld tip 54 ensures that cutting tool 50 of machine head 42 has clearance and does not interfere with the welding operation. It will be understood that machining head 42 could extend and retract vertically relative to welding tip 54, and the present invention is not limited to the specific arrangement shown and described herein.

With further reference to FIG. 3, two axis mechanism 16 includes a base 74 that is secured to support 6. A second portion 76 of two axis mechanism 16 is rotatably mounted to the base 74 for rotation about a horizontal axis as shown by the arrow "B." An upper portion 78 of the second portion 76 is movably mounted for rotation about a second axis as indicated by the arrow "A." A work plate assembly 14 may be secured to the upper portion 78 of two-axis mechanism 16. The work plate assembly 14 may comprise a ceramic plate 82 and a metal foundation work plate 84 that is secured to the ceramic plate 82. A powered actuator and drive motor 79 (shown with dashed lines) and 80 are operably connected to controller 12, and provides for powered rotation of upper portion 78 and plate assembly 14 about the A and B axes. The two-axis mechanism 16 may comprise a known device utilized in CNC machines and the like, such that a detailed description of the two-axis mechanism 16 is not believed to be required. Also, it will be understood that the 3D metal printing machine 1 would not necessarily need to include a two-axis mechanism 16 to create a 5 axis 3D metal printing machine if 3 axis movement is sufficient for a particular application.

Figure 2:
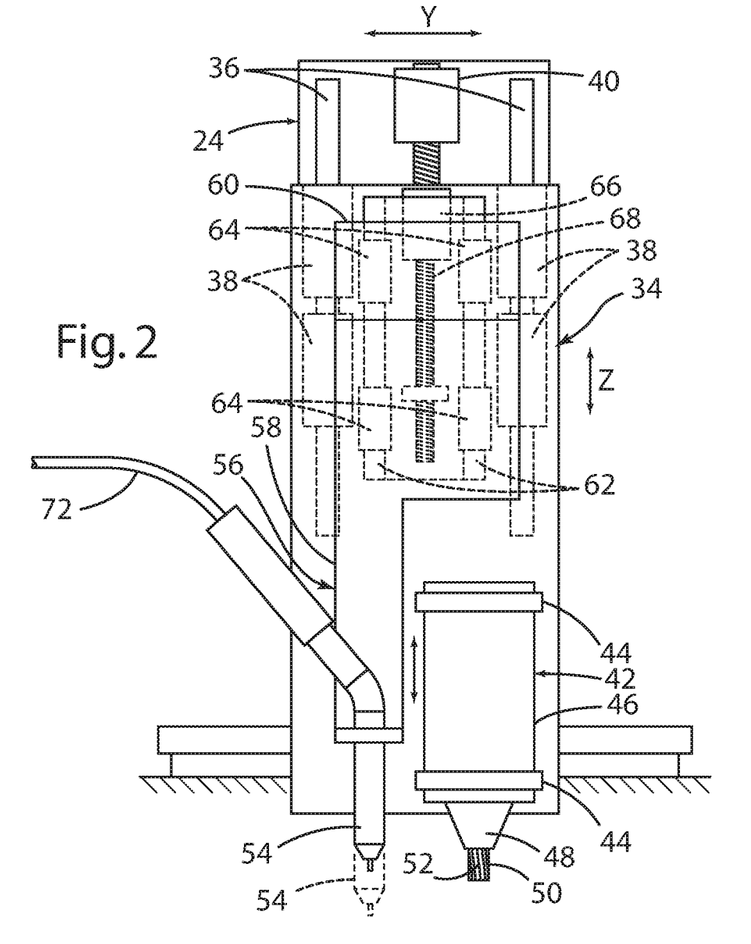
FIG. 2 is an elevational view of a portion of the machine of FIG. 1.
Figure 3:
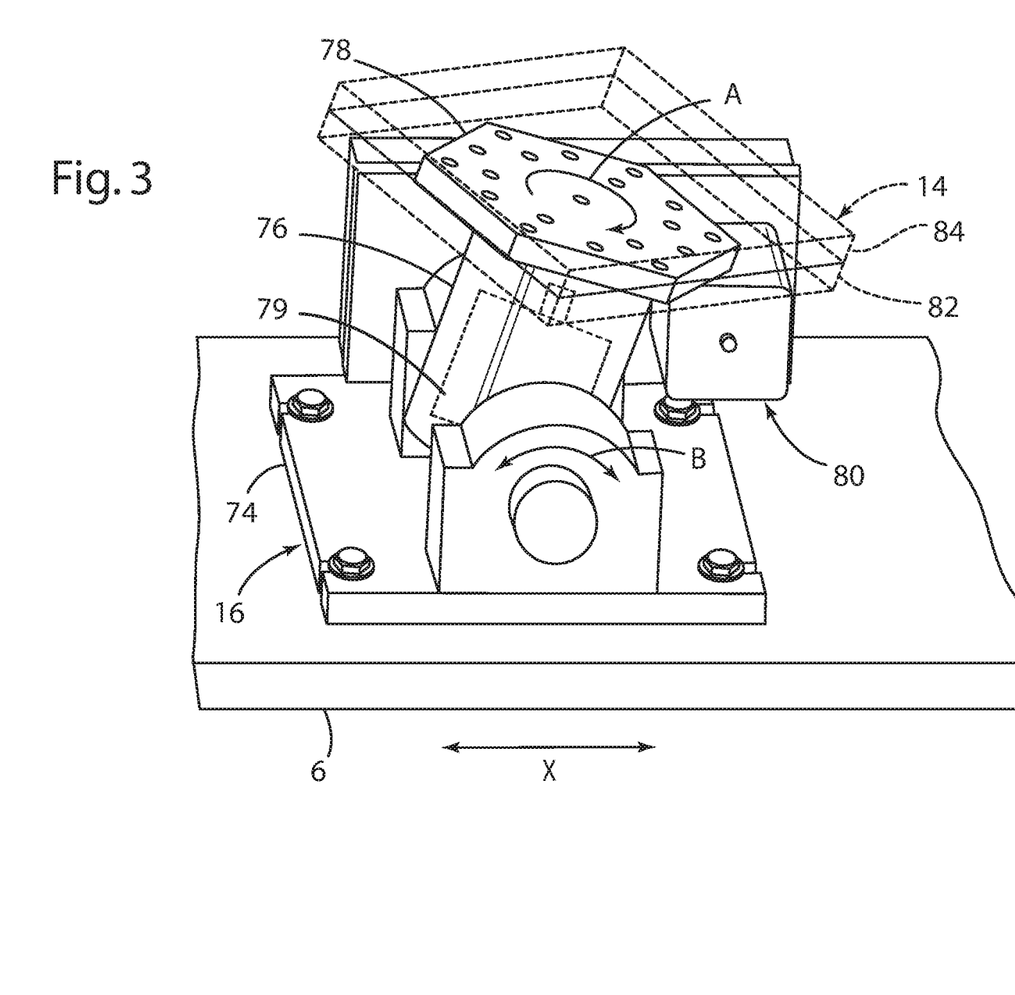
FIG. 3 is an isometric view of a portion of the machine of FIG. 1.

During operation, the weld tip 54 is shifted to the extend position shown in dashed lines in FIG. 2, and weld tip 54 is brought into close proximity with the metal foundation plate 84. The welding unit 70 is then actuated by controller 12, and the weld tip 54 is moved along the metal foundation plate 84 according to a software program loaded into controller 12 to create a bead of molten metal having a predefined shape and size as required to form a first layer of a part. The welding tip 54 can be moved along the desired path by actuating electric motor 10 to shift support table 6 (FIG. 1) and/or by actuating electric motor 30 to shift bracket structure 24. The two axis mechanism 16 may also be actuated by controller 12 to provide movement of plate assembly 14 relative to welding tip 54. The electric motor 40 (and/or electric motor 66) may also be actuated to control the height of plate 34 to provide proper vertical positioning of weld tip 54 relative to the metal foundation 84. As discussed in more detail below in connection with FIGS. 6-8, the molten bead of metal produced by weld tip 54 may have a shape and size that is specifically selected to provide a layer corresponding to a shape of a finished metal part. The metal wire supplied by welding unit 70 may comprise steel, aluminum, titanium, stainless steel, or other suitable metal.

After the metal bead is deposited utilizing the weld tip 54, the weld tip 54 may be retracted relative to the machining head 42 by actuation of electric motor 66. The machining head 42 may then be actuated by controller 12, and the cutting tool 50 may be brought into engagement with the weld bead after the molten metal has solidified. Cutting tool 50 can be utilized to remove a portion of the weld bead to thereby shape the bead. The machining head 42 is then deactivated, and the welding tip 54 is then extended, and an additional layer of molten metal is then deposited on top of the previously deposited metal bead to form a "new" metal bead. The new metal bead can then be machined utilizing machining head 42. As discussed below in connection with FIGS. 6-8, this process may be repeated to build up successive layers of metal having a shape corresponding to a component that was designed utilizing CAD software. It will be understood that successive layers of metal may be deposited utilizing the weld tip 54 without machining of each layer. Alternatively, the machining head 42 may be utilized to machine one or more layers of metal after the layers are deposited by welding tip 54 if required to produce a particular part.

Figure 4:
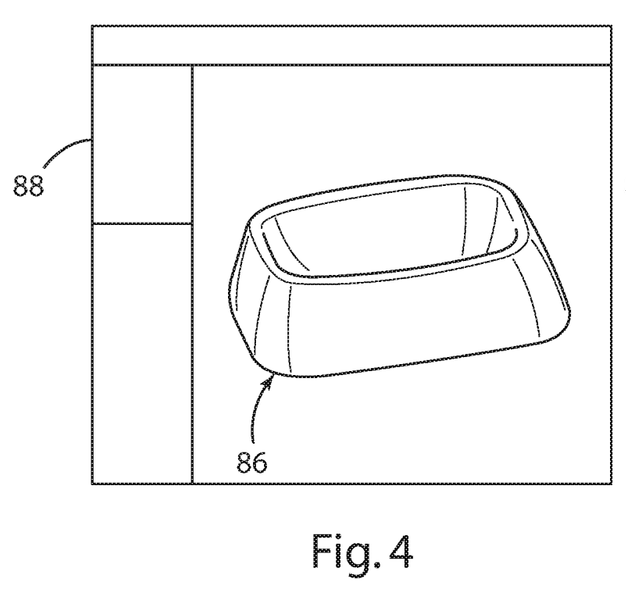
FIG. 4 is an isometric view of a 3D CAD model of a part.
Figure 5:
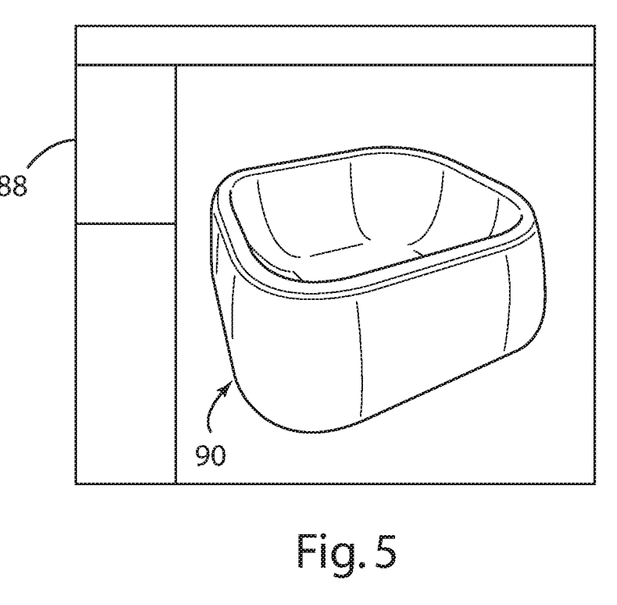
FIG. 5 is an isometric view of an STL or CAM model.

With further reference to FIGS. 4 and 5, a CAD model 86 is shown on a display screen 88. CAD model 86 may be developed utilizing known CAD software. The CAD model 86 may be utilized to produce a stereolithographic (STL) model/data 90 utilizing known software. The STL model data format is then imported to a 3D slicing software program to create individual slices (layers) based on desired parameters such as layer height, solid layer, in fill, fill pattern, pattern spacing, diameter of the wire, size of the objects, starting point, etc. Software may also be utilized to produce CNC G-code that is used to control machining head 42 and the position of weld tip 54. CAM software may also be used to produce CNC G-code directly from the CAD model. Thus, additional information such as speeds, feed rates, and cooling requirements may also defined for a specific machining head 42 and part being produced by 3D metal printing machine 1 as required. Depending on the desired surface quality, machining can be done on the top and/or on the sides of the layer(s).

The CNC program is then loaded into the controller 12. During operation, the controller 12 provides controlled movement of the weld tip 54 and machine head 42 in the three linear X, Y, Z and two rotational directions A, and B which are controlled by the CNC program. The power and feed rate is controlled by weld unit 70 and controller 12. As noted above, after a layer of metal is deposited, the welding head or tip 54 may be retracted utilizing motor 66 to permit machining operations prior to depositing the next layer of metal. The cutting tool path is also guided by the CNC program.

Figure 6:
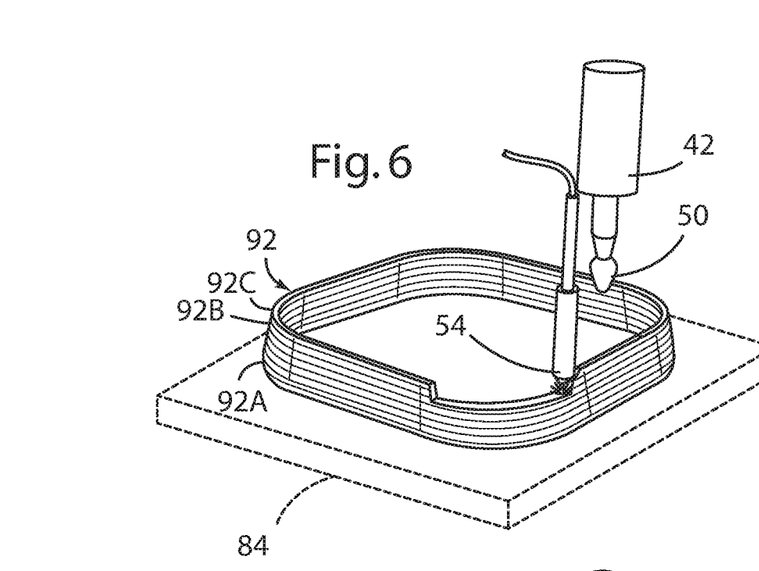
FIG. 6 is a schematic isometric view of a 3D metal printing apparatus and process according to one aspect of the present invention.
Figure 7:
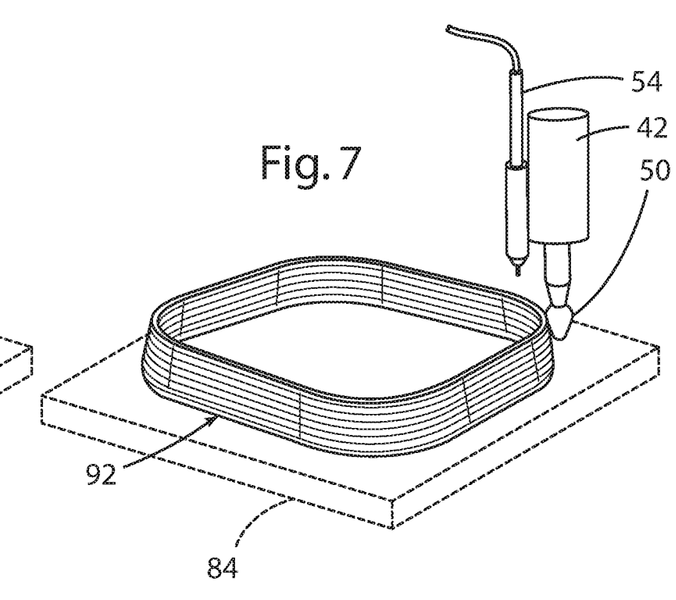
FIG. 7 is an isometric view of a machining process according to the present invention.
Figure 8:
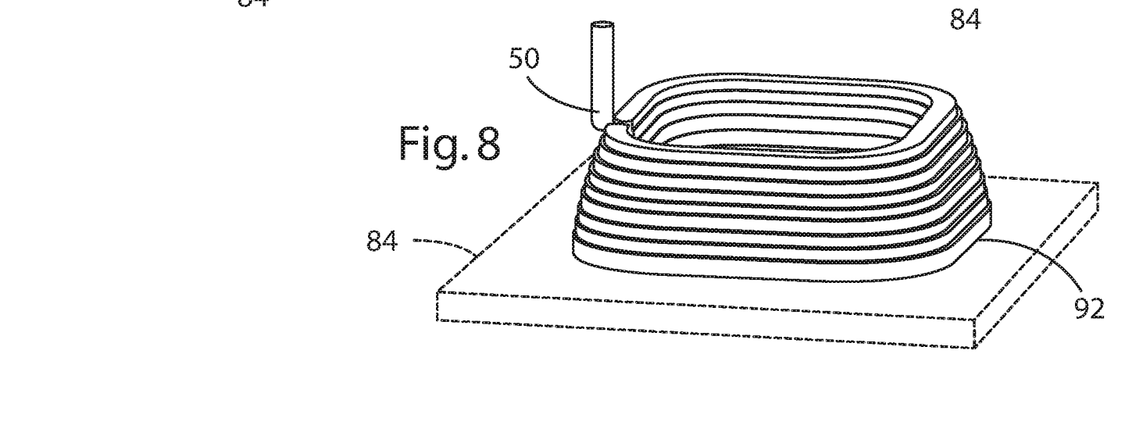
FIG. 8 is an isometric view of a machining process according to the present invention in which additional layers of metal have been added.
Figure 9:
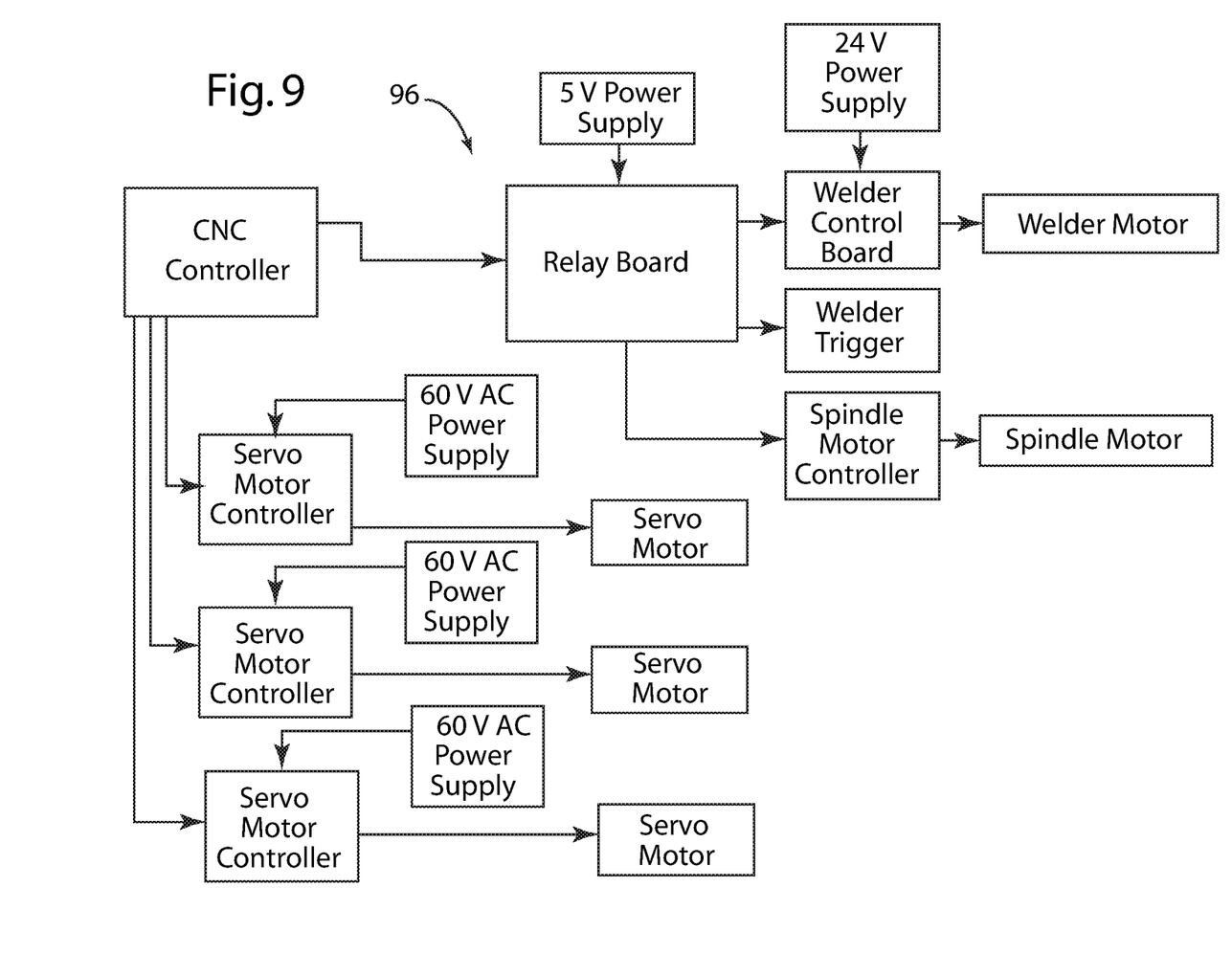
FIG. 9 is a schematic drawing of the electrical components of the system.
Figure 10:
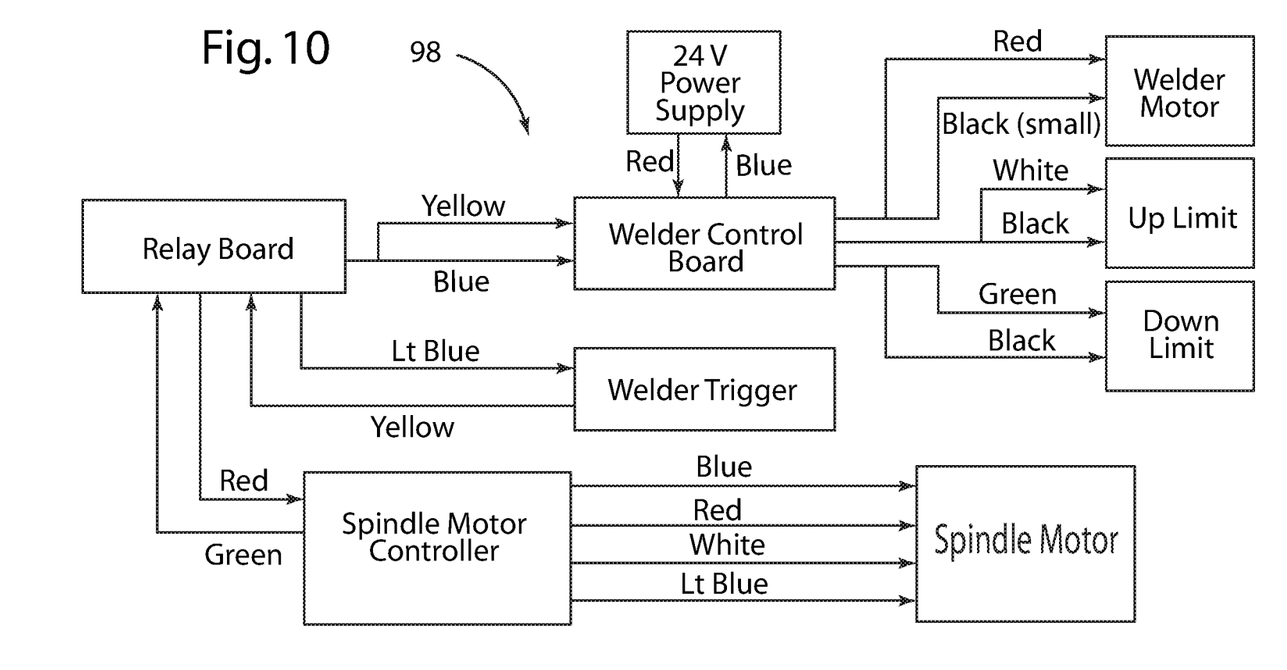
FIG. 10 is a schematic view of the welder electrical system.
Figure 11:
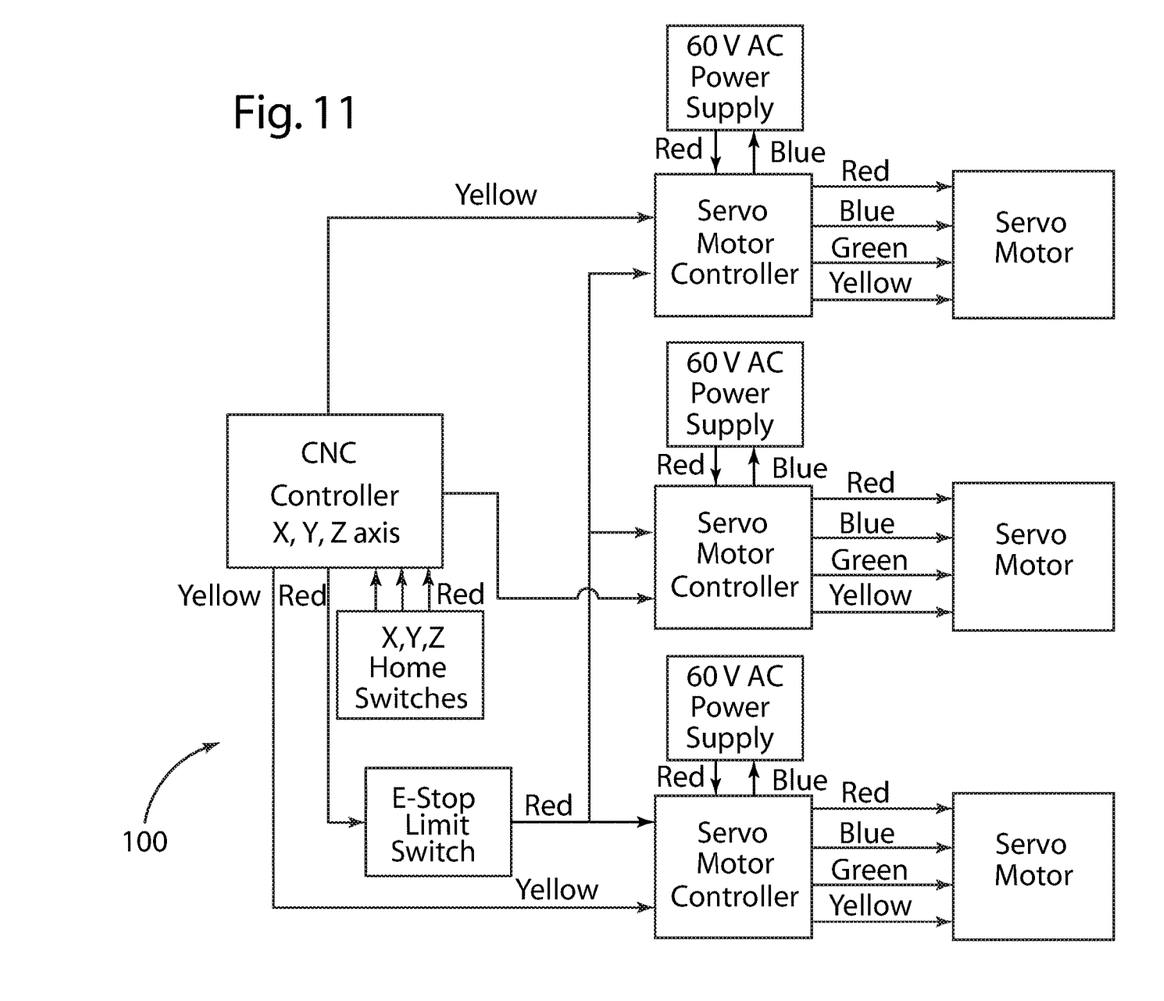
FIG. 11 is a schematic view of the electrical motor control.
Figure 12:
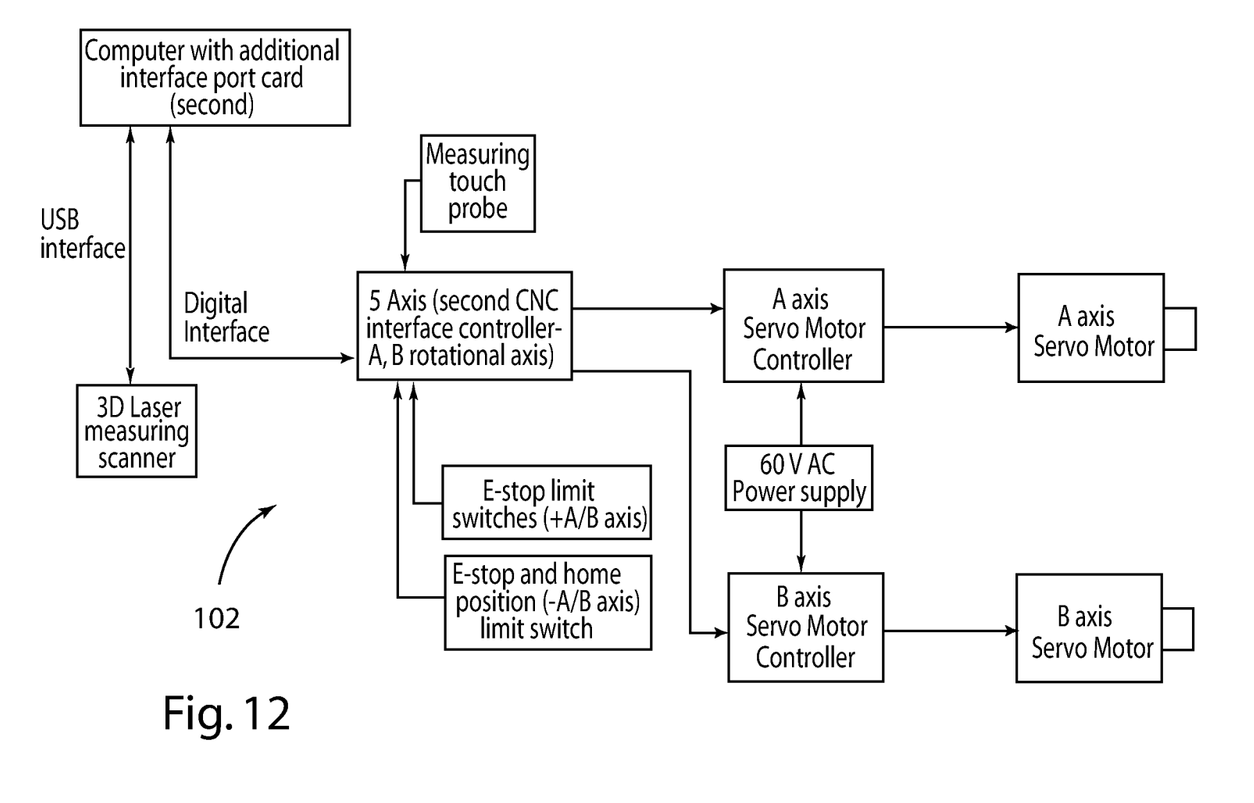
FIG. 12 is a schematic view of an electrical system for the A and B axes device of FIG. 3.
Figure 13:
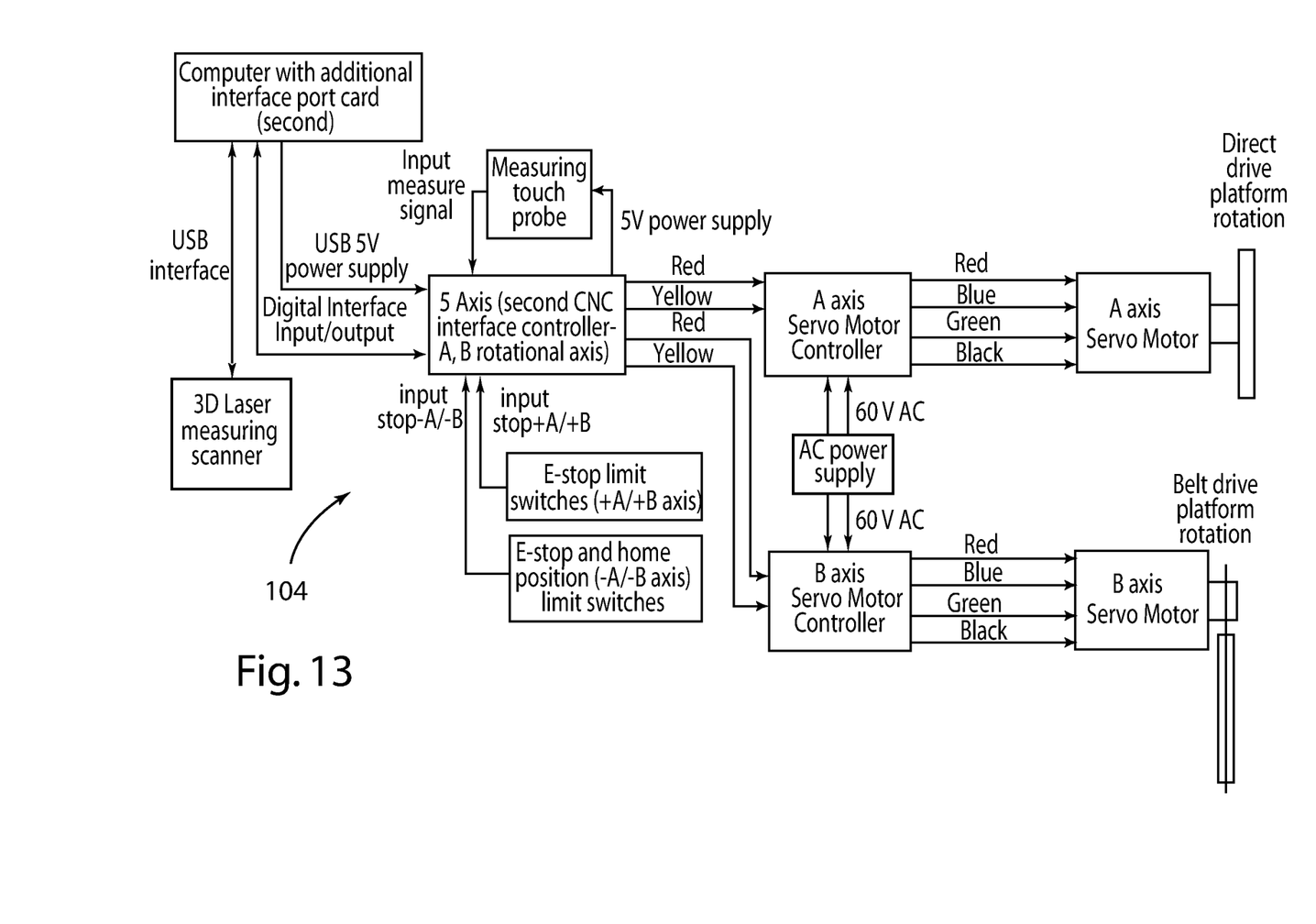
FIG. 13 is a schematic view of an electrical system for the A and B axes device of FIG. 3.

As shown schematically in FIG. 6, a partially completed metal part 92 comprises layers of metal 92A-92C deposited onto metal plate 84 by weld tip 54. As shown in FIG. 7, the partially fabricated metal part 92 may be machined utilizing cutting tool 50 and machining head 42 upon retraction of the welding tip 54. With further reference to FIG. 8, the part 92 may be finished utilizing the cutting tool 50 after the required number of layers of metal have been deposited. After the part has been fabricated, it can be cut from the metal foundation 84. The thickness, height, and size of the built-up walls can be controlled precisely through deposition and machining control at each step and layer.

Referring again to FIG. 1, a measuring unit 94 or 95 may be utilized upon completion of the work piece to verify that the part that has been fabricated meets the dimensional requirements. The measuring unit may comprise a probe 94 (mechanical contact device) or a 3D laser measuring scanner 95. Measuring unit 94 may comprise a 5 way mechanical contact device with a spherical ruby tip (sizes 1, 2, 3, or 4 mm). The probe 94 is mounted in the spindle collet 48 or on a separate fixture. Through digital input interface, a CNC controller is coupled to a probing input. For measurement, a G-code based predefined routine is used. A G-code or CNC code program controls welding/machining operations. Because the G-code is based on a standard, the probe 94 works independently of the type of the CNC machine controller. When used with the machine 1, the probe 94 scans the 3D surface and X, Y, Z coordinates on each contact point are obtained and saved to the same computer controlling the CNC machine 1. Another measuring device, 3D laser scanner 95, can be attached to machine 1 to scan the work piece by moving in X and/or Y directions. It can directly measure X, Y, Z coordinates and save them to the computer. Using CAD or 3D modeling software, a 3D model can be created from these measured coordinates. The 3D (measured) model may be used for inspection, reverse engineering, or to create a new CNC program for welding/machining. In contrast to the process utilized in Coordinate Measuring Machines (CMM), the CNC scan movements are utilized in this process.

A process according to the present invention does not require removing and alignment of the measured workpiece because the probe 94 or laser scanner 95 may be mounted in machine 1 while the part being measured remains in place on machine 1. The number of measurements can be controlled depending on the type of the measured surface within the resolution of the machine. For common surfaces such as cylinders, spheres, cones, and planes, relatively few points are sufficient to establish the measured surface. For 2D profiles or 3D free form surfaces the number of measured points can be increased to achieve a required resolution.

Probe 94 or 3D laser scanner 95 can be utilized to measure a part that has been fabricated utilizing machine 1 without removing the part. If measurements show that the part does not have the required shape/size, the part can be modified by adding additional metal utilizing weld tip 54 and/or machined utilizing cutting tool 50. In this way, the part can be modified by adding and/or removing metal as required to provide the required dimensions.

Also, existing metal components that are worn or damaged may be positioned in machine 1, and probe 94 or laser scanner 95 can be utilized to measure the component. The measured 3D model can be compared to a 3D model of the component without wearing/damage, and machine 1 can be utilized to add and/or remove metal as required to repair the component.

Exemplary electrical circuits 96, 98, 100, 102, and 104 are shown in FIGS. 9-13. It will be understood that the 3D metal printing machine 1 is not limited to the specific configuration described herein, and the electrical circuits of FIGS. 9-13 are merely examples of suitable arrangements.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An apparatus for fabricating 3D metal components, the apparatus comprising:
   a support table configured to retain a partially formed metal component during fabrication of the metal component;
   a two-axis device secured to the support table, wherein during fabrication of the metal component, the two-axis device is configured to rotate the partially formed metal component about a rotation axis and to pivot the partially formed metal component about a pivot axis that intersects the rotation axis;
   a head assembly including a welding head and a machining head, the machining head including a tool that is configured to remove metal deposited by the welding head during fabrication of the metal component; and
   a control system configured to move the welding head relative to the support table and to deposit molten metal in successive layers, wherein the control system is configured such that the tool removes metal from at least one layer of metal deposited by the welding head after the molten metal has solidified.

2. The apparatus of claim 1, wherein:
   the head assembly includes a powered weld actuator configured to extend and retract the welding head relative to the machining head.

3. The apparatus of claim 2, wherein:
the apparatus includes a base;
the head assembly includes a support structure and a powered vertical actuator that shifts the support structure vertically relative to the base when the powered vertical actuator is actuated by the controller.

4. The apparatus of claim 3, wherein:
the machining head is mounted on the support structure; and
the welding head is movably mounted to the support structure by a vertical linear guide and the powered weld actuator such that the welding head can be shifted vertically relative to the support structure upon actuation of the powered weld actuator.

5. The apparatus of claim 4, wherein:
the welding head is configured to supply metal wire and inert gas during welding operations to form a bead of metal.

6. The apparatus of claim 5, wherein:
the machining head includes a rotating spindle having a collet that is configured to retain a metal cutting tool.

7. The apparatus of claim 3, wherein:
the apparatus includes three linear guides and three linear powered actuators that are configured to move at least one of the support structure and the head assembly in X, Y, and Z directions relative to the other of the support structure and the head assembly.

8. The apparatus of claim 1, including:
a measuring device configured to provide surface coordinates of the partially formed metal component.

9. The apparatus of claim 1, wherein:
the two-axis device includes a metal foundation work plate;
the welding head is configured to deposit molten metal on the metal foundation work plate.

10. The apparatus of claim 1, wherein:
the controller is configured to utilize CNC G-code to control movement of the welding head and/or machining head relative to the support table.

11. The apparatus of claim 1, wherein:
the two-axis device includes a first portion secured to the support and a second portion pivotably mounted to the first portion for pivoting about the pivot axis.

12. A method of forming 3D metal components, the method comprising:
depositing molten metal onto a support in successive layers while rotating the deposited molten metal about a rotating axis and pivoting the deposited molten metal about a pivot axis that intersects the rotational axis using a two-axis device secured to the support to form a 3D metal structure utilizing a machine that controls the depositing of metal according to a predefined program; and
removing at least a portion of the 3D metal structure utilizing a machining process that is controlled according to a predefined program, wherein the machining process is performed without removing the 3D metal structure from the support.

13. The method of claim 12, including:
providing an apparatus having a welding head that deposits molten metal and a machining head that removes metal that has been deposited by the welding head.

14. The method of claim 13, including:
generating CNC code corresponding to a 3D CAD model of a component to be fabricated.

15. The method of claim 14, wherein:
the CNC code controls movement of the welding head and the machining head relative to the support during fabrication of the 3D metal structure.

16. The method of claim 12, including:
removing at least a portion of a selected layer of metal utilizing a machining tool, followed by depositing molten metal onto the selected layer of metal.

17. The method of claim 12, including:
forming a 3D CAD model of the 3D metal structure; and
converting the 3D CAD model into a stereolithographic (STL) or computer aided manufacturing (CAM) model.

18. The method of claim 17, including:
utilizing the STL or computer aided manufacturing (CAM) model to generate data comprising individual layers of material.

19. The method of claim 18, including:
utilizing the data comprising individual layers of material to generate a CNC program that is configured to control movement of a welder and a machine tool relative to a support.

20. The method of claim 12, including:
utilizing a MIG welding system to deposit the successive layers of molten metal.

* * * * *